Dec. 28, 1948.  C. E. BENNETT  2,457,438
JOINT FOR PIPE LINES
Filed July 23, 1946
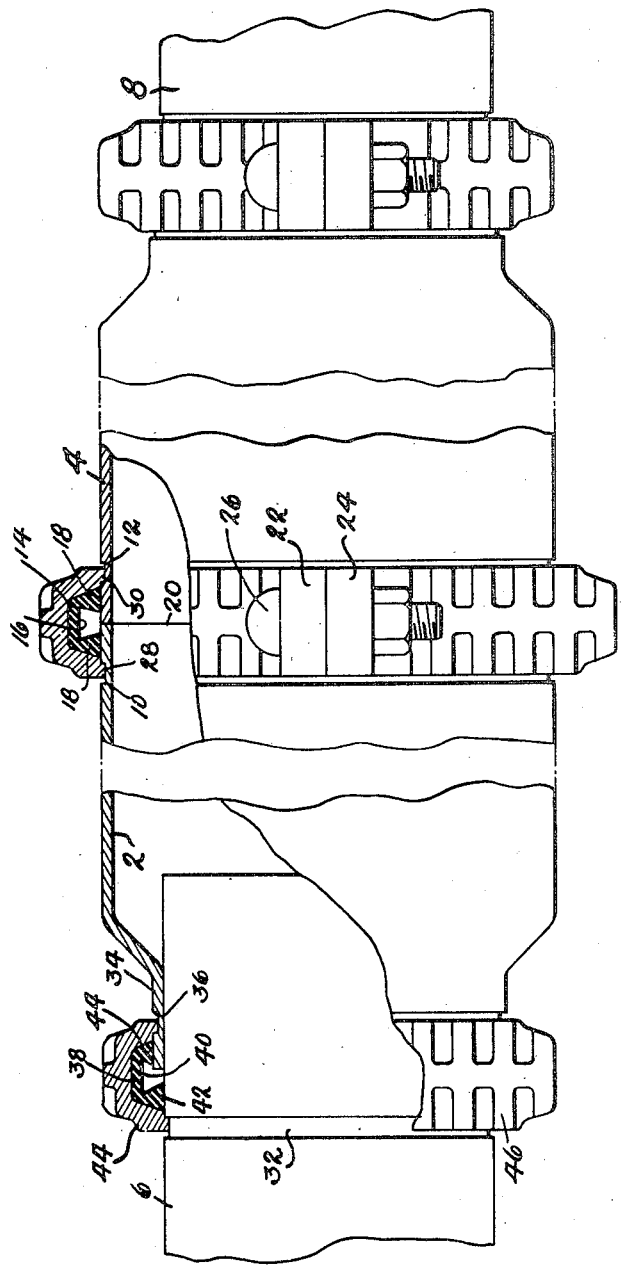
INVENTOR.
Charles E. Bennett
BY
James G. Bethell Patented Dec. 28, 1948

2,457,438

UNITED STATES PATENT OFFICE 2,457,438

JOINT FOR PIPE LINES

Charles E. Bennett, Ridgewood, N. J., assignor to The Okonite-Callender Cable Company, Incorporated, Paterson, N. J., a corporation of New Jersey Application July 23, 1946, Serial No. 685,574

4 Claims. (Cl. 285—194)

My invention relates to an improvement in joints for pipe lines, particularly joints for pipe lines of electric cable systems of the type wherein the cable conductors are enclosed in a pipe line filled with an insulating fluid which is maintained under superatmospheric pressure of the order of 200 to 225 pounds per square inch.

In such systems the pipe line is provided at intervals with joints, either stop joints or semi-stop joints. These joints conventionally comprise a casing which is coupled at each end to the pipe line section. Under the high pressures employed in these systems it is something of a problem to obtain and maintain a fluidtight seal at each end of the joint casing, inasmuch as the pipe ends may not be precisely aligned with each other, so that reliance is usually placed upon the coupling employed to draw them into alignment. Then again sagging of the line due to settling of the earth presents another problem so far as maintaining a fluidtight seal is concerned.

The present invention provides a construction wherein the joint casing is coupled to the pipe line ends by a very simple arrangement which does not require precise alignment of the two elements to be joined; and in which sagging or settling of the line has no detrimental effect upon the seal; and in which but two bolts are usually necessary properly and securely to fasten the coupling in place.

In the accompanying drawing an embodiment of the invention has been shown in part sectional elevation.

Referring to the drawing in detail, 2 and 4 designate two sections of a joint casing which are to be joined together, the casing to be coupled to pipe lengths 6 and 8. The two pipe lengths 6 and 8 are part of the pipe line of the well known type of electric power cable system above referred to wherein the cable conductors are enclosed in the pipe line and the line maintained filled with oil or other insulating fluid at high pressure.

The joint shown in the drawings may be a stop joint or a semi-stop joint, and it will be understood that the ends of the cable conductors are spliced together within the casing. For clarity of illustration, however, I have omitted the conductors, etc., from the drawing as these are conventional practice.

Referring first of all to the construction by which the adjacent ends of the joint casing are coupled to each other: It will be seen from the drawing that each of these casing sections is provided with a peripheral groove designated 10 and 12, respectively, extending completely around each casing section. Surrounding the joint casing sections about the abutting ends of the sections is a moulded one-piece gasket 14. This gasket is composed of a suitable synthetic rubberlike material highly resistant to oil and other insulating fluids. There are several suitable materials on the market one of which is sold under the name of Victaulite. This gasket is not a solid gasket, but is composed of a web portion 16 and two side flanges 18. The flanges are triangular in cross-section, the bases of the triangles resting upon the casing sections at each side of the division 20 where the two casing sections abut. The inside diameter of the gasket is such that the gasket must be stretched over the casing sections 2 and 4.

Surrounding the gasket 14 is a metal housing comprising two sections 22 and 24 bolted together by two bolts 26. This housing is provided with peripheral annular extensions or keys 28 and 30 which engage the peripheral grooves 10 and 12, respectively. It is to be noted that the grooves 10 and 12 are slightly wider than the annuli 28 and 30 to provide slight clearance to allow for some angular or longitudinal movement of the casing sections 2 and 4.

This construction provides a very effective coupling for joining the joint casing sections to each other. The inside dimensions of the housing sections 22 and 24 are such that when the two sections are bolted together the gasket 14 is but slightly compressed or deformed. It will be appreciated that even with the high pressures mentioned within the joint casing there can be no leak past the gasket, in fact the tendency is to tighten the seal with pressure rise.

Respecting the construction by which the joint casing sections are coupled to the pipe lengths 6 and 8. It will be seen from the drawings that each end of the joint casing telescopes the pipe line. The couplings at each end of the joint casing are of the same construction, so one only will be described. As illustrated, the pipe length 6 is inserted within the joint casing section 2. The pipe length 6 is provided with a peripheral annular grooves 32, while the portion 34 of the joint casing section 2 is provided with an annular groove 36. Stretched about the pipe length and the joint casing between the two grooves 32 and 36 is a gasket 38. This gasket may be of the same material as the gasket 14.

The gasket 38 is composed of a web 40 and two flanges 42 and 44 triangular in cross section. The base of the flange 42 rests upon the pipe length 6, while the flange 44, which is considerably shorter, rests upon the joint casing section 2 between the groove 36 and the end of the casing. Surrounding the gasket is a sectional housing the two sections 44 and 46 of which are bolted together by bolts as described in connection with housing sections 22 and 24. This housing interiorly is shaped to the contour of the gasket and its dimensions are such that when the two housing sections are bolted in place the gasket will be compressed but very slightly.

It will be apparent from the foregoing that the construction just described provides an exceedingly simple arrangement for coupling each end of the joint casing to the pipe lengths 6 and 8.

It will be appreciated also that this provides a fluid tight seal even though the pressure in the pipe line and joint casing may be of the order hereinbefore referred to. By reason of the construction employed it will be seen that the higher the pressure within the pipe line and joint casing the tighter the seal.

It will be appreciated furthermore, that by reason of the construction employed a fluidtight seal is obtained even though there may be misalignment of the joint casing and pipe lengths, and even though there may be settling of the line.

While I have described a specific embodiment of my invention, it is to be understood that changes may be made therein within the spirit and scope of my invention.

What I claim is:

1. In a joint for electric cable systems, a coupling for coupling the joint casing to a pipe line of the system and which extends into the casing, the combination of a continuous gasket of resilient material and composed of a web and two side flanges stretched about the pipe line and joint casing, one flange of the gasket resting upon the joint casing, the other upon the pipe line, and a housing for the gasket, said housing being composed of two sections bolted together, the two sides or edges of the housing being shouldered to provide two annuli constituting keys which enter annular grooves formed in the pipe line and joint casing.

2. In a joint for electric cable systems, a coupling for coupling the telescoping joint casing and pipe line of the system, the combination of a housing encircling the pipe line and joint casing, the inner edges of the housing being shouldered to provide annular keys adapted loosely to seat in annular grooves formed in the pipe line and joint casing, a hollow gasket of resilient material stretched about the pipe line and joint casing and fitting the interior of the housing, said gasket comprising a web and two integral side flanges one of which seats upon the pipe line and the other upon the joint casing.

3. In a joint for electric cable systems, a coupling for coupling the joint casing to a pipe line of the system, the combination of a housing, encircling the pipe line and joint casing, the two opposed sides of the housing being shouldered to provide two annular keys adapted to engage grooves provided in the periphery of the pipe line and joint casing, a resilient gasket within the housing stretched about the pipe line and joint casing, said gasket being composed of a web and two side flanges, said side flanges being triangular in cross section, the base of one resting upon the pipe line and the base of the other resting upon the joint casing.

4. In a joint for electric cable systems, a coupling for sealing the joint casing to a pipe line of the system and which extends into the casing, the combination of a two-section housing encircling the joint casing and pipe line, the two opposed sides of the housing being shouldered to provide annular keys projecting into a groove formed in the pipe line and a groove formed in the joint casing, an annular gasket of resilient material within the housing and stretched about the pipe line and joint casing, said gasket comprising a web and two integral side flanges, the said flanges being triangular in cross section, the base of one flange engaging the pipe line, the base of the other flange resting upon the joint casing, the last mentioned flange being of substantially less depth than the first mentioned flange.

CHARLES E. BENNETT.

REFERENCES CITED

The following references are of record in the file of this patent:

UNITED STATES PATENTS

| Number | Name | Date |
| --- | --- | --- |
| 96,545 | Brady | Nov. 9, 1869 |
| 2,041,132 | Johnson | May 19, 1936 |